(12) United States Patent  
Kobayashi et al.

(10) Patent No.: US 9,315,116 B2  
(45) Date of Patent: Apr. 19, 2016

(54) ELECTRIC DRIVE VEHICLE

(71) Applicant: HITACHI CONSTRUCTION MACHINERY CO., LTD., Tokyo (JP)

(72) Inventors: Hiroyuki Kobayashi, Tokyo (JP); Akira Kikuchi, Tokyo (JP); Tomohiko Yasuda, Ibaraki (JP); Takayuki Sato, Ibaraki (JP); Shinjiro Saito, Tokyo (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 14/395,573

(22) PCT Filed: Apr. 11, 2013

(86) PCT No.: PCT/JP2013/060971  
§ 371 (c)(1),  
(2) Date: Oct. 20, 2014

(87) PCT Pub. No.: WO2013/157484  
PCT Pub. Date: Oct. 24, 2013

(65) Prior Publication Data  
US 2015/0298577 A1  Oct. 22, 2015

(30) Foreign Application Priority Data

Apr. 20, 2012  (JP) ................. 2012-096701

(51) Int. Cl.  
*B60L 9/00* (2006.01)  
*G06F 7/70* (2006.01)  
(Continued)

(52) U.S. Cl.  
CPC ............. *B60L 15/2072* (2013.01); *B60L 3/106* (2013.01); *B60L 15/20* (2013.01); *B60L 15/2009* (2013.01);  
(Continued)

(58) Field of Classification Search  
USPC ...................................... 701/22, 50  
See application file for complete search history.

(56) References Cited

U.S. PATENT DOCUMENTS 4,924,943 A * 5/1990 Maichle ............ A01B 63/1006  
  172/1  
5,500,798 A * 3/1996 Inagaki ................ B60G 17/016  
  280/5.507

(Continued)

FOREIGN PATENT DOCUMENTS

JP  2002-218605 A  8/2002  
JP  2009-1158 A  1/2009  
(Continued)

*Primary Examiner* — Thomas G Black  
*Assistant Examiner* — Tyler Paige  
(74) *Attorney, Agent, or Firm* — Baker Botts L.L.P.

(57) ABSTRACT

Provided is an electric drive vehicle which can control wheel speed so as to achieve an appropriate slip ratio of the wheels even when pitching vibration of the vehicle is large. This electric drive vehicle is provided with electric motors (1, 4), drive wheels (3, 6), driven wheels (7, 8), an electric motor controller (50) for controlling the electric motors, and speed detectors (9-12) for detecting the wheel speed of the drive wheels and the driven wheels. The electric motor controller is provided with: a slip ratio calculation unit (21) which calculates the slip ratio of the drive wheels from the wheel speed detected values detected by the speed detectors; a torque command calculation unit (20) which calculates torque commands for the drive wheels; a drive force calculation unit (19) which, from the wheel speed detected values of the drive wheels and the torque commands of the drive wheels, calculates the drive force generated in the drive wheels; and filters (54, 55) which reduce the pitching vibration frequency components of the vehicle included in the slip ratio and the drive force.

14 Claims, 14 Drawing Sheets

(51) Int. Cl.
*B60L 15/20* (2006.01)
*B60L 3/10* (2006.01)

(52) U.S. Cl.
CPC ......... *B60L 2200/36* (2013.01); *B60L 2220/46* (2013.01); *B60L 2240/421* (2013.01); *B60L 2240/423* (2013.01); *B60L 2240/461* (2013.01); *B60L 2240/465* (2013.01); *B60L 2260/28* (2013.01); *B60L 2270/145* (2013.01); *Y02T 10/648* (2013.01); *Y02T 10/7275* (2013.01)

(56) References Cited

U.S. PATENT DOCUMENTS

| | | | | |
|---|---|---|---|---|
| 2002/0019295 | A1* | 2/2002 | Kobayashi | B60W 10/06 744/174 |
| 2006/0025917 | A1* | 2/2006 | Pandey | B60K 6/46 701/82 |
| 2007/0214685 | A1* | 9/2007 | Polk | B62D 33/0604 37/304 |
| 2008/0208415 | A1* | 8/2008 | Vik | E21C 41/26 701/50 |
| 2009/0132116 | A1* | 5/2009 | Tanaka | B60L 1/003 701/36 |
| 2011/0257847 | A1* | 10/2011 | Uematsu | B60T 8/1769 701/48 |
| 2011/0270497 | A1* | 11/2011 | Uematsu | B60T 8/175 701/50 |
| 2012/0130601 | A1* | 5/2012 | Banerjee | E02F 5/32 701/50 |
| 2013/0116874 | A1* | 5/2013 | Ichinose | B60L 7/18 701/22 |

FOREIGN PATENT DOCUMENTS

| | | |
|---|---|---|
| JP | 2009-77505 A | 4/2009 |
| JP | 2011-223691 A | 11/2011 |

* cited by examiner

SOLID LINE: THE INVENTION
DASHED LINE: BACKGROUND ART

ELECTRIC DRIVE VEHICLE

TECHNICAL FIELD

The present invention relates to an electric drive vehicle which can run when its drive wheels are driven by electric motors.

BACKGROUND ART

In order to maintain running stability of an electric drive vehicle, it is necessary to estimate a friction characteristic accurately and control wheel speed so that each wheel can achieve an appropriate slip ratio with respect to the friction characteristic. The friction characteristic mentioned herein means the relation between a slip ratio of a drive wheel and a friction coefficient between the wheel and a road surface or a physical amount (for example, a drive force of the drive wheel) equivalent to the friction coefficient. For example, Patent Literature 1 has been known as a technique for estimating a friction characteristic between a wheel and a road surface and controlling torque to maximize the drive force during acceleration running or maximize the brake force during deceleration running by use of the estimation result. Patent Literature 1 is a technique in which a slip ratio of each drive wheel is calculated from detected values of wheel speeds of the drive wheel and a corresponding driven wheel, a friction coefficient is further calculated from a ground load of the drive wheel and a drive force of the drive wheel in a travelling direction, and a gradient of the friction coefficient relative to the slip ratio is calculated by use of the friction coefficient and the slip ratio.

CITATION LIST

Patent Literature

Patent Literature 1: JP-A-2009-1158

SUMMARY OF INVENTION

Technical Problem

When the vehicle body is accelerated or decelerated, pitching vibration occurs in the vehicle body so that the front and rear of the vehicle body vibrate vertically with opposite phases to each other. Generally, in a car, etc., such pitching vibration is not largely included in the waveforms of the drive force and the slip ratio. Accordingly, the pitching vibration does not affect control of the wheel speed that much. However, the pitching vibration increases as the vehicle weight increases. Accordingly, a pitching vibrational frequency spectrum is largely included in the waveforms of the slip ratio and the drive force when the vehicle weight is in the order of several hundred tons like a dump truck. Therefore, the pitching vibrational frequency spectrum becomes a factor that may inhibit calculation of the gradient of the drive force relative to the slip ratio particularly in a working vehicle having a large vehicle weight. In addition, the working vehicle represented by a dump truck is so large not only in vehicle weight but also in load that the pitching vibrational frequency spectrum can change in accordance with presence/absence of the load. Thus, the pitching vibrational frequency spectrum may affect control of the wheel speed but Patent Literature 1 gives no suggestion about the influence of the pitching vibration.

An object of the invention is to provide an electric drive vehicle which can control wheel speed to achieve an appropriate slip ratio of each wheel even when pitching vibration of the vehicle body is large.

Solution to Problem

In order to attain the aforementioned object, the invention provides an electric drive vehicle including: electric motors; drive wheels which are driven or braked by the electric motors; driven wheels which are driven by rotation of the drive wheels; an electric motor controller which controls the electric motors; and speed detectors which detect wheel speeds of the drive wheels and the driven wheels; wherein: the electric motor controller has: a slip ratio calculation unit which calculates a slip ratio of the drive wheels from detected values of the wheel speeds detected by the speed detectors; a torque command calculation unit which calculates a torque command for the drive wheels; a drive force calculation unit which calculates a drive force to be generated in the drive wheels, from the detected value of the wheel speed of the drive wheels and the torque command for the drive wheels; and a filter which reduces a pitching vibrational frequency spectrum of a vehicle body included in each of the slip ratio and the drive force.

According to the invention, due to the provision of the filter which reduces the pitch vibrational frequency spectrum of the vehicle body included in each of the slip ratio and the drive force, it is possible to calculate an appropriate slip ratio of the wheel even when pitching vibration of the vehicle body is large. By use of the calculation result, it is therefore possible to control the wheel speed to achieve the appropriate slip ratio.

In addition, preferably, the electric drive vehicle according to the invention has the following configuration.

The filter has a filter characteristic to eliminate the pitching vibration of the vehicle body with frequency spectrum of about 1 to 3 Hz. It has been generally known that the pitching vibrational frequency of a heavy electric drive vehicle such as a dump truck is 1 to 3 Hz. However, when the filter characteristic of the configuration is provided, the wheel speed can be controlled to achieve an appropriate slip ratio of the wheel even in a large-sized electric drive vehicle.

The configuration is to provide so that the electric drive vehicle further includes: a weight detector which detects a load of cargo; and a filter characteristic calculation unit which calculates the pitching vibrational frequency spectrum of the vehicle body based on a value of the load detected by the weight detector; wherein: the filter eliminates the pitching vibrational frequency spectrum of the vehicle body calculated by the filter characteristic calculation unit. For example, the vehicle weight of a working vehicle such as a dump truck changes largely between when the vehicle is loaded with cargo and when the vehicle is not loaded with cargo. Accordingly, the value of the pitching vibrational frequency of the vehicle body also varies largely. However, when the pitching vibrational frequency spectrum of the vehicle body is calculated based on the value of the load as in the configuration, the wheel speed can be controlled to achieve an appropriate slip ratio of the wheel regardless of the load of cargo.

In this case, when the filter characteristic calculation unit calculates a pitching vibrational frequency of the vehicle body so that the pitching vibrational frequency of the vehicle body can decrease as the value of the load increases, the wheel speed can be controlled to achieve an appropriate slip ratio in accordance with the value of the load.

In addition, the configuration is to provide so that: a threshold for determining whether the cargo is loaded or not is set in advance; and the filter characteristic calculation unit outputs a first pitching vibrational frequency when the value of the load detected by the weight detector is not smaller than the threshold while the filter characteristic calculation unit outputs a second pitching vibrational frequency when the value of the load detected by the weight detector is smaller than the threshold. According to the configuration, a pitching vibrational frequency to be outputted can be selected in accordance with load/unload of cargo. Thus, there is an advantage that control of the wheel speed can be simplified.

Preferably, the electric drive vehicle further includes: a drive force gradient calculation unit which calculates a gradient of the drive force relative to the slip ratio from the slip ratio and the drive force in each of which the pitching vibrational frequency spectrum of the vehicle body has been reduced by the filter; and a slip determination unit which makes slip determination based on the gradient of the drive force relative to the slip ratio, the gradient being calculated by the drive force gradient calculation unit.

In this case, the slip determination unit may determine that the drive wheels slip when the gradient of the drive force relative to the slip ratio calculated by the drive force gradient calculation unit changes from positive to negative for the first time during acceleration or deceleration running.

Or the slip determination unit may determine that the drive wheels slip when the gradient of the drive force relative to the slip ratio calculated by the drive force gradient calculation unit exceeds a predetermined threshold for the first time during acceleration or deceleration running.

When the slip determination unit makes the slip determination, the torque command calculation unit adds a torque reduction command to the torque command so as to make the slip ratio equal to the slip ratio at the time of the slip determination. With this configuration, the wheels can be rotated with an appropriate slip ratio.

In addition, in order to attain the aforementioned object, the invention provides an electric drive vehicle including: electric motors; drive wheels which are driven or braked by the electric motor; driven wheels which are driven by rotation of the drive wheels; an electric motor controller which controls the electric motors; and speed detectors which detect wheel speeds of the drive wheels and the driven wheels; wherein: the electric motor controller has: a filter which reduces a pitching vibrational frequency spectrum of a vehicle body included in each of detected values of the wheel speeds detected by the speed detectors; and a slip ratio calculation unit which calculates a slip ratio of the drive wheels from the detected values of the wheel speeds in each of which the pitching vibrational frequency spectrum of the vehicle body has been reduced by the filter.

According to the invention, due to the provision of the filter which reduces the pitch vibrational frequency spectrum of the vehicle body included in each of the detected values of the wheel speeds, it is possible to calculate an appropriate slip ratio of the wheel even when pitching vibration of the vehicle body is large. By use of the calculation result, it is therefore possible to control the wheel speed to achieve the appropriate slip ratio.

In addition, preferably, the electric drive vehicle according to the invention has the following configuration.

The filter has a filter characteristic to eliminate the pitching vibration of the vehicle body with frequency spectrum of about 1 to 3 Hz. It has been generally known that the pitching vibrational frequency of a heavy electric drive vehicle such as a dump truck is 1 to 3 Hz. However, when the filter characteristic of the configuration is provided, the wheel speed can be controlled to achieve an appropriate slip ratio of the wheel even in a large-sized electric drive vehicle.

The configuration is to provide so that the electric drive device further includes: a weight detector which detects a load of cargo; and a filter characteristic calculation unit which calculates the pitching vibrational frequency spectrum of the vehicle body based on a value of the load detected by the weight detector; wherein: the filter eliminates the pitching vibrational frequency spectrum of the vehicle body calculated by the filter characteristic calculation unit. For example, the vehicle weight of a working vehicle such as a dump truck changes largely between when the vehicle is loaded with cargo and when the vehicle is not loaded with cargo. Accordingly, the value of the pitching vibrational frequency of the vehicle body also varies largely. However, when the pitching vibrational frequency spectrum of the vehicle body is calculated based on the value of the load as in the configuration, the wheel speed can be controlled to achieve an appropriate slip ratio of the wheel regardless of the load of cargo.

In this case, when the filter characteristic calculation unit calculates a pitching vibrational frequency of the vehicle body so that the pitching vibrational frequency of the vehicle body can decrease as the value of the load increases, the wheel speed can be controlled to achieve an appropriate slip ratio in accordance with the value of the load.

In addition, the configuration is to provide so that a threshold for determining whether the cargo is loaded or not is set in advance; and the filter characteristic calculation unit outputs a first pitching vibrational frequency when the value of the load detected by the weight detector is not smaller than the threshold while the filter characteristic calculation unit outputs a second pitching vibrational frequency when the value of the load detected by the weight detector is smaller than the threshold. According to the configuration, a pitching vibrational frequency to be outputted can be selected in accordance with load/unload of cargo. Thus, there is an advantage that control of the wheel speed can be simplified.

Advantageous Effects of Invention

According to the electric drive vehicle according to the invention, it is possible to calculate an appropriate slip ratio of each wheel even when pitching vibration of the vehicle occurs, and it is possible to make control to achieve appropriate wheel speed in accordance with the calculation result.

DESCRIPTION OF EMBODIMENTS

Figure 1:
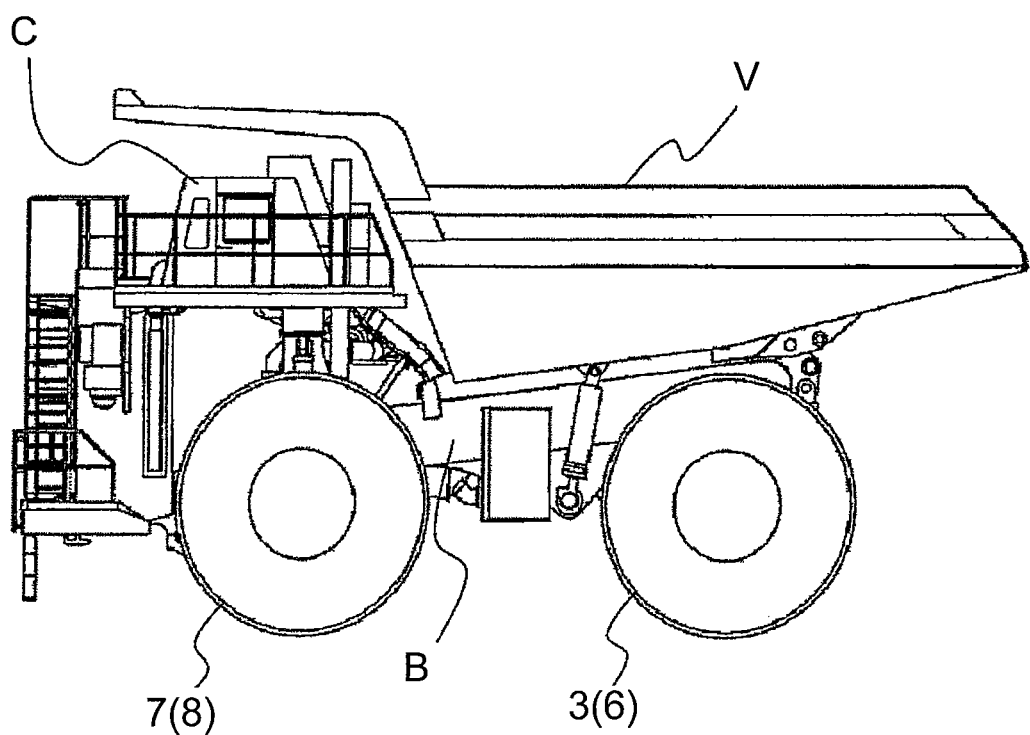
FIG. 1 A side view of a dump truck according to a first embodiment of the invention.

Embodiments of an electric drive vehicle according to the present invention will be described below with reference to the drawings. Incidentally, the following embodiments are examples in which the invention is applied to a dump truck. As shown in FIG. 1, a dump truck according to a first embodiment is configured to include a frame B which forms a body, a driver's cab C which is disposed on the front side of the frame B, wheels (driven wheels) 7 and 8 and wheels (drive wheels) 3 and 6, and a vessel V which can be moved rotationally in an up/down direction. The dump truck runs with the wheel 3 serving as the drive wheel. In addition, the vessel V serves for loading cargo such as crushed stone etc. of an operated mine etc.

Figure 2:
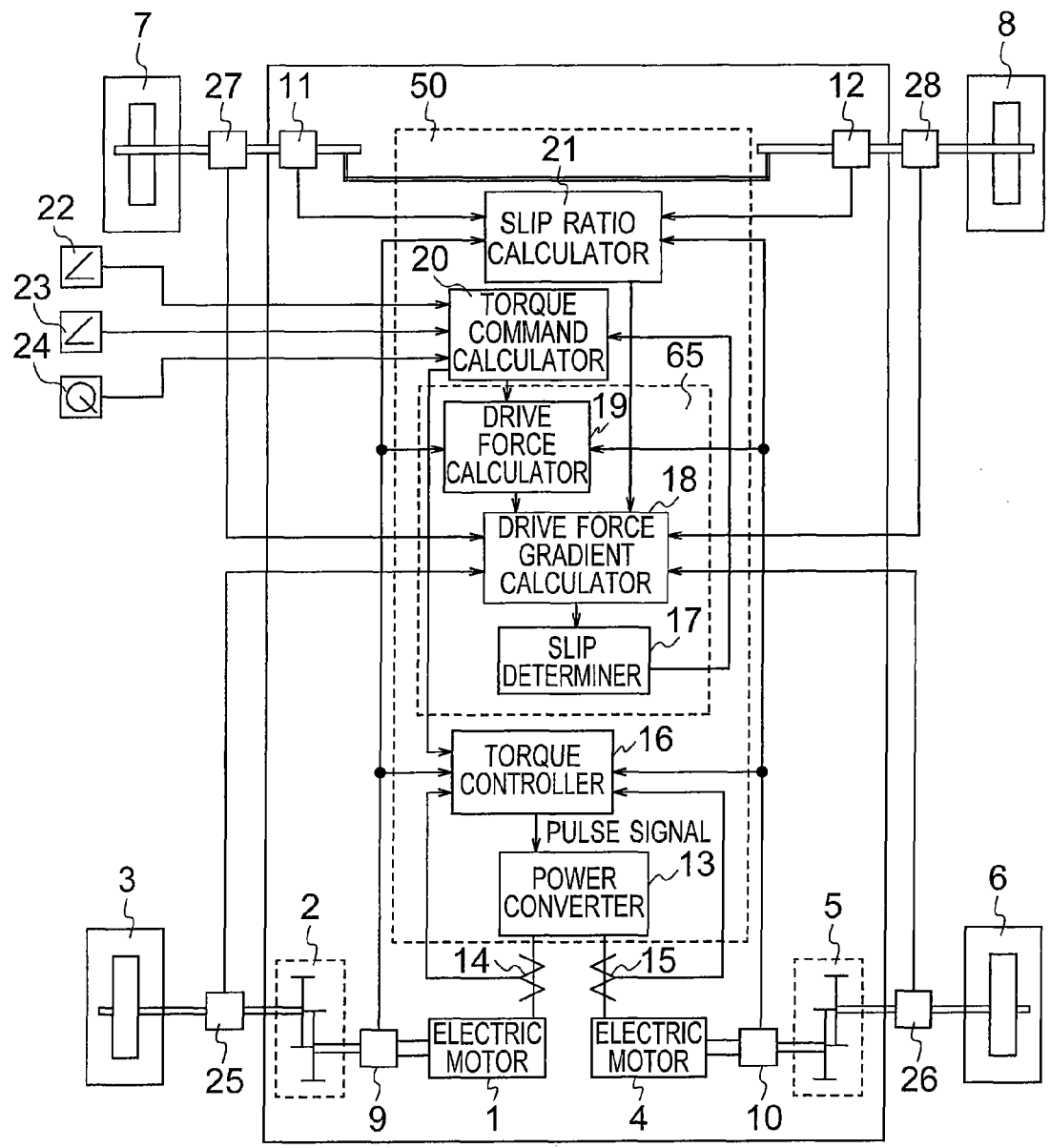
FIG. 2 A view of the configuration of a control device of the dump truck shown in FIG. 1.

Next, details of a drive system of the dump truck will be described with reference to FIG. 2. As shown in FIG. 2, in the dump truck, an electric motor 1 drives the wheel 3 through a gear 2 and an electric motor 4 drives the wheel 6 through a gear 5 so that the vehicle can move forward or backward. The electric motor 1 and the electric motor 4 are controlled by an electric motor controller 50. A power converter 13 drives the electric motor 1 and the electric motor 4. A current detector 14 is connected between the power converter 13 and the electric motor 1 so as to detect a current flowing therebetween. A current detector 15 is connected between the power converter 13 and the electric motor 4 so as to detect a current flowing therebetween.

A speed detector 9 is connected to the electric motor 1 so as to detect rotation speed of the electric motor 1. A speed detector 10 is connected to the electric motor 4 so as to detect rotation speed of the electric motor 4. A speed detector 11 is connected to an axle of the wheel 7 so as to detect rotation speed of the wheel 7. A speed detector 12 is connected to an axle of the wheel 8 so as to detect rotation speed of the wheel 8. Incidentally, load detectors 25, 26, 27 and 28 are connected to axles of the wheels 3, 6, 7 and 8 respectively so that loads imposed on the respective wheels can be detected.

An accelerator opening detector 22 detects an opening of an accelerator pedal in accordance with an accelerator operation performed by a driver. A brake opening detector 23 detects an opening of a brake pedal in accordance with a brake operation performed by the driver. A steering angle detector 24 detects a steering angle in accordance with a steering operation performed by the driver.

A torque command calculator (torque command calculation unit) 20 receives, as inputs, the detected value of the accelerator opening outputted by the accelerator opening detector 22, the detected value of the brake opening outputted by the brake opening detector 23, and the detected value of the steering angle outputted by the steering angle detector 24, and outputs a torque command to the electric motor 1 and a torque command to the electric motor 4.

A friction characteristic calculator 65 serves for calculating a friction characteristic of a road surface and is provided with a drive force calculator (drive force calculation unit) 19, a drive force gradient calculator (drive force gradient calculation unit) 18, and a slip determiner (slip determination unit) 17.

The drive force calculator 19 receives, as inputs, the torque commands outputted to the electric motor 1 and the electric motor 4 from the torque command calculator 20 and the detected values of the wheel speeds of the drive wheels outputted from the speed detectors 9 and 10, and outputs a drive force of the drive wheels.

The drive force gradient calculator 18 receives, as inputs, the drive force of the drive wheels outputted by the drive force calculator 19, a slip ratio outputted from a slip ratio calculator 21 and the detected values of the loads of the respective wheels outputted from the load detectors 25, 26, 27 and 28, and outputs a gradient of the drive force relative to the slip ratio.

The slip determiner 17 receives, as an input, the gradient of the drive force relative to the slip ratio outputted by the drive force gradient calculator 18, and makes slip determination. When determining that slip occurs in one or both of the wheel 3 and the wheel 6, the slip determiner 17 outputs a torque reduction command to the torque command calculator 20 so as to reduce torque of one or both of the electric motor 1 and the electric motor 4.

Based on the torque command issued to the electric motor 1 by the torque command calculator 20, the detected value of the current outputted by the current detector 14, and the detected value of the rotation speed outputted by the speed detector 9, a torque controller 16 outputs a gate pulse signal to the power converter 13 by PWM (Pulse Width Modulation) control so that torque outputted by the electric motor 1 can follow the torque command issued to the electric motor 1. In addition, based on the torque command issued to the electric motor 4 by the torque command calculator 20, the detected value of the current outputted by the current detector 15, and the detected value of the rotation speed outputted by the speed detector 10, the torque controller 16 outputs a gate pulse signal to the power converter 13 by PWM control so that torque outputted by the electric motor 4 can follow the torque command issued to the electric motor 4. In the power converter 13 which receives these gate pulse signals, switching devices such as IGBTs (Insulated Gate Bipolar Transistors) perform switching at a high speed so that highly responsive torque control can be achieved.

Figure 3:
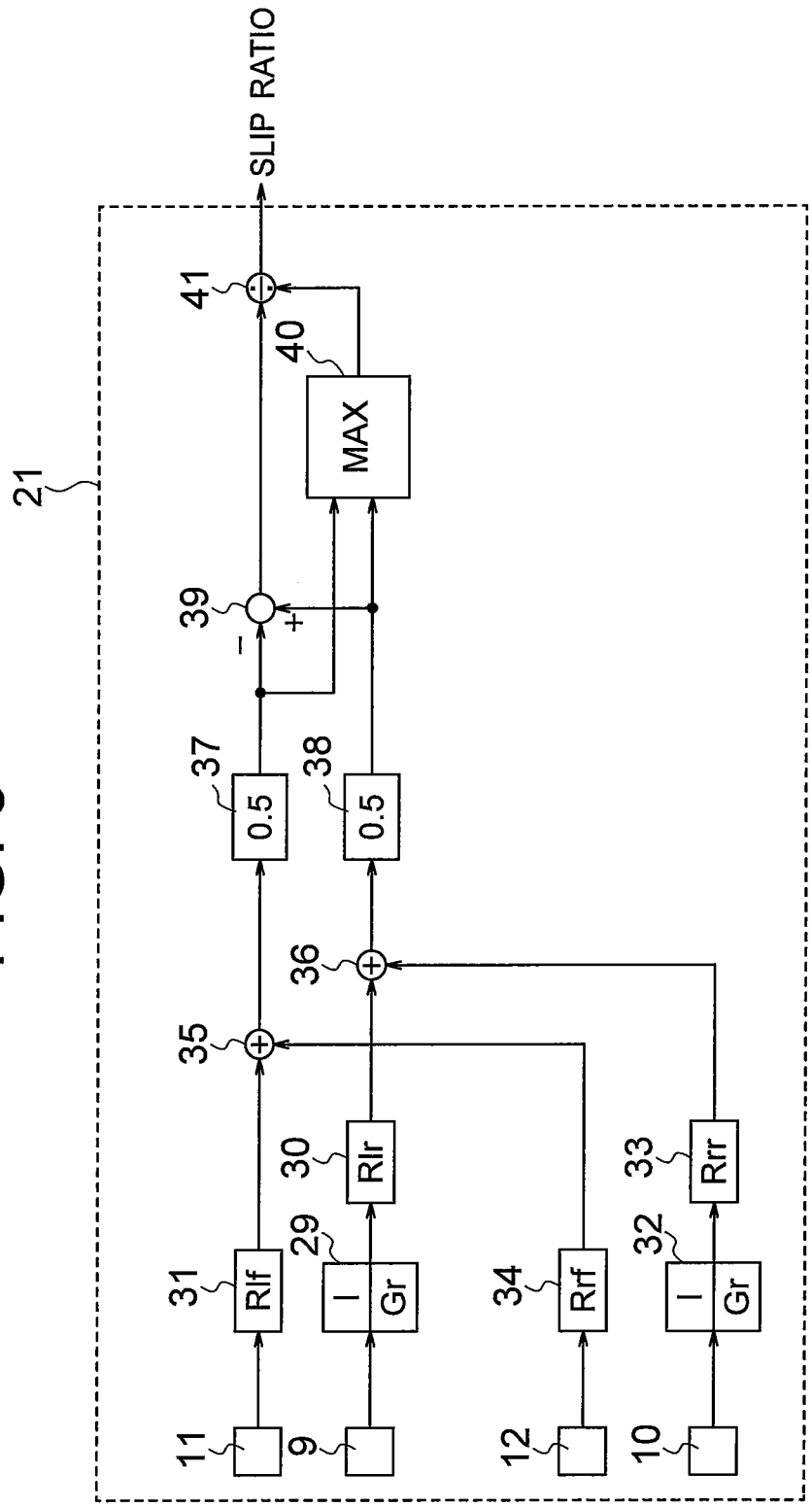
[FIG. 3.A view of the configuration of a slip ratio calculator shown in FIG. 2.

Next, the configuration of the slip ratio calculator (slip ratio calculation unit) 21 will be described with reference to FIG. 3. As shown in FIG. 3, the slip ratio calculator 21 receives, as inputs, the detected values of the rotation speeds outputted by the speed detector 9, the speed detector 10, the speed detector 11 and the speed detector 12, and calculates a slip ratio of the wheels 3 and 6 serving as drive wheels.

A gain 29 receives, as an input value, the rotation speed of the electric motor 1 outputted by the speed detector 9, and multiplies the input value by a gain given as the reciprocal of a gear ratio Gr of the gear 2. Thus, the gain 29 outputs a detected value of a rotation speed of the wheel 3. A gain 30 receives, as an input, the detected value of the rotation speed of the wheel 3 outputted by the gain 29, and multiplies the input by a radius $R_{tr}$ of the wheel 3. Thus, the gain 30 outputs a detected value of a wheel speed of the wheel 3. A gain 31 receives, as an input, the detected value of the rotation speed of the wheel 7 outputted by the speed detector 11, and multiplies the input by a radius $R_{tf}$ of the wheel 7. Thus, the gain 31 outputs a detected value of a wheel speed of the wheel 7. A gain 32 receives, as an input, the detected value of the rotation speed of the electric motor 4 outputted by the speed detector 10, and multiplies the input by a gain given as the reciprocal of a gear ratio Gr of the gear 5. Thus, the gain 32 outputs a detected value of a rotation speed of the wheel 6. A gain 33 receives, as an input, the detected value of the rotation speed of the wheel 6 outputted by the gain 32, and multiplies the input by a radius $R_{rr}$ of the wheel 6. Thus, the gain 33 outputs a detected value of a wheel speed of the wheel 6. A gain 34 receives, as an input, the detected value of the rotation speed of the wheel 8 outputted by the speed detector 12, and multiplies the input by a radius $R_{rf}$ of the wheel 8. Thus, the gain 34 outputs a detected value of a wheel speed of the wheel 8.

An adder 35 receives, as inputs, the detected value of the wheel speed of the wheel 7 and the detected value of the wheel speed of the wheel 8, and outputs the sum of the inputs. An adder 36 receives, as inputs, the detected value of the wheel speed of the wheel 3 and the detected value of the wheel speed of the wheel 6, and outputs the sum of the inputs. A gain 37 receives, as an input, the sum of the detected values of the wheel speeds of the wheels 7 and 8 outputted by the adder 35, and multiplies the input by a gain of 0.5. Thus, the gain 37 outputs an average value of the detected values of the wheel speeds of the wheels 7 and 8. Again 38 receives, as an input, the sum of the detected values of the wheel speeds of the wheels 3 and 6 outputted by the adder 36, and multiplies the input by a gain of 0.5. Thus, the gain 38 outputs an average value of the detected values of the wheel speeds of the wheels 3 and 6. The slip ratio calculator 21 receives, as inputs, the average value of the detected values of the wheel speeds of the wheels 7 and 8 outputted by the gain 37 and the average value of the detected values of the wheel speeds of the wheels 3 and 6 outputted by the gain 38, and calculates a slip ratio of the wheels 3 and 6.

Consider now that the average value of the detected values of the wheel speeds of the wheels 7 and 8 represents an actual vehicle speed because the wheels 7 and 8 are driven wheels. A subtracter 39 receives, as inputs, the average value of the detected values of the wheel speeds of the drive wheels and the average value of the detected values of the wheel speeds of the driven wheels, and outputs a difference between the inputs. A maximum value selector 40 receives, as inputs, the average value of the detected values of the wheel speeds of the drive wheels and the average value of the detected values of the wheel speeds of the driven wheels, and outputs a larger one of the inputs. A divider 41 divides the output of the subtracter 39 by the output of the maximum value selector 40. Thus, the divider 41 outputs a slip ratio.

To express the slip ratio by a formula, the following formula is established.

[Number 1]

$$\lambda = \frac{Vr - V}{\text{Max}\{Vr, V\}} \quad (1)$$

in which $\lambda$ designates the slip ratio of the drive wheels outputted by the slip ratio calculator 21, $V_r$ designates the wheel speed of the drive wheels and V designates the wheel speed of the driven wheels.

Figure 4:
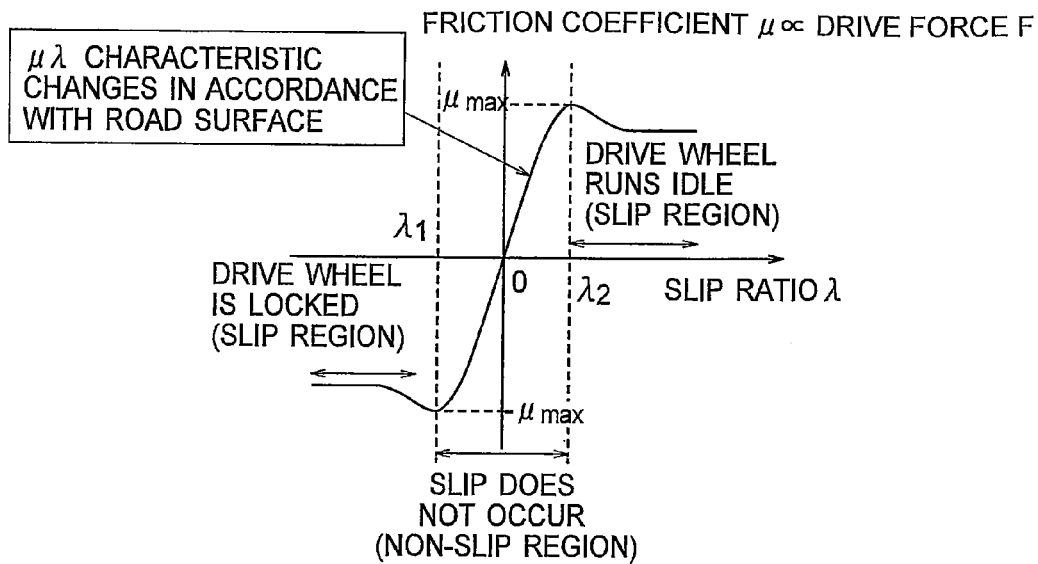
FIG. 4 A view of the relation between a slip ratio and a friction coefficient between a wheel and a road surface.

Next, the relation between the slip ratio and a friction coefficient for a wheel and a road surface will be described. The relation between a slip ratio $\lambda$ and a friction coefficient $\mu$ between a wheel and a road surface is shown in FIG. 4. Here, the friction coefficient $\mu$ in a negative region expresses a fact that a direction of force generated between the wheel and the road surface is opposite to a travelling direction of the vehicle. Generally, in a region where the value of the slip ratio is small, the value of the friction coefficient between the wheel and the road surface also increases as the value of the slip ratio increases. Therefore, the force acting between the wheel and the road surface also increases. Hence, no slip occurs. This also applies to the case where the slip ratio is a negative value. Accordingly, no slip occurs in a region in which the slip ratio $\lambda$ satisfies $\lambda_1 < \lambda < \lambda_2$ in FIG. 4.

On the other hand, when the value of the slip ratio exceeds a certain region, the value of the friction coefficient between the wheel and the road surface conversely decreases as the value of the slip ratio increases. Therefore, the force acting between the wheel and the road surface also decreases. Hence, slip occurs. Slip occurs in a region where the slip ratio $\lambda$ satisfies $\lambda > \lambda_2$ or $\lambda < \lambda_1$ in FIG. 4. Incidentally, the friction coefficient $\mu$ is in proportion to a drive force F of the drive wheel.

Accordingly, the slip ratio $\lambda_2$ or $\lambda_1$ which changes in accordance with the state of the road surface is derived as a control target and the slip ratio is controlled to be equal to the derived value (that is, the rotation speed of the wheel is controlled), so that a maximum drive force or a maximum brake force can be obtained during acceleration or during deceleration. Hereinafter, this control will be referred to as "slip control".

The change of the wheel speed during the slip control on each drive wheel will be described. First, the change of the wheel speed will be described when an accelerator operation is performed. Generally, when an accelerator operation is performed on a slippery road surface, the drive wheel runs idle. When slip control is not performed on such an occasion, the wheel speed of the drive wheel becomes much larger than the wheel speed of the driven wheel. In the embodiment, however, slip control is performed to control the rotations of the wheels so that the wheel speed of the drive wheel can reach a speed close to the wheel speed of the driven wheel.

Figure 5:
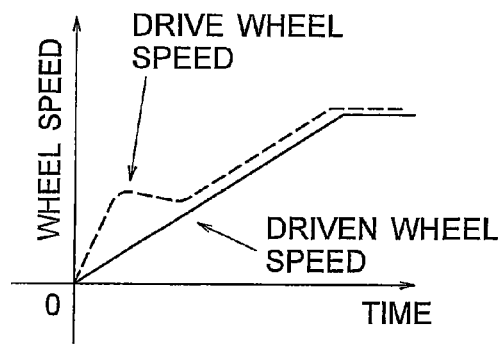
FIG. 5 Waveforms of wheel speeds of a driven wheel and a drive wheel during acceleration running when slip control is performed.

FIG. 5 shows examples of waveforms of wheel speeds of each driven wheel and each drive wheel on which slip control is performed during acceleration running. The relation (wheel speed of drive wheel) ≥ (wheel speed of driven wheel) is always established during accelerator operation. Accordingly, the aforementioned numerical formula (1) can be converted into the following formula.

[Number 2]

$$\lambda = 1 - \frac{V}{Vr} \quad (2)$$

Accordingly, the value of the slip ratio $\lambda$ during accelerator operation is always positive. When accelerator operation is performed in a state in which the vehicle body is stopping or running, the slip ratio increases in the positive direction in the beginning. When the slip determiner 17 which will be described later determines that the drive wheel slips, the wheel speed of the drive wheel exhibits behavior to approach the wheel speed of the driven wheel because the drive torque of the drive wheel is slacked off.

Next, the change of the wheel speed during brake operation will be described. Generally, when brake operation is performed on a slippery road surface, the drive wheel is locked. When slip control is not performed on such an occasion, the wheel speed of the drive wheel becomes substantially zero. In the embodiment, however, slip control is performed to control the rotations of the wheels so that the wheel speed of the drive wheel can reach a speed close to the wheel speed of the driven wheel.

Figure 6:
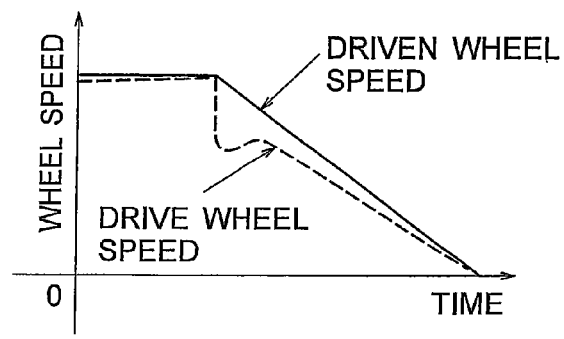
FIG. 6 Waveforms of wheel speeds of the driven wheel and the drive wheel during deceleration running when slip control is performed.

FIG. 6 shows examples of waveforms of wheel speeds of each driven wheel and each drive wheel on which slip control is performed during deceleration running. The relation (wheel speed of driven wheel)≥(wheel speed of drive wheel) is always maintained during brake operation. Accordingly, the aforementioned numerical formula (1) can be converted into the following formula.

[Number 3]
$$\lambda = \frac{Vr}{V} - 1 \quad (3)$$

Accordingly, it can be known that the value of the slip ratio λ during brake operation is always negative. When brake operation is performed while the vehicle body is running, the slip ratio increases in the negative direction in the beginning. However, when the slip determiner 17 which will be described later determines that the drive wheel slips, the wheel speed of the drive wheel exhibits behavior to approach the wheel speed of the driven wheel because the brake torque of the drive wheel is slacked off.

Next, details of calculations performed respectively by the drive force calculator 19, the drive force gradient calculator 18 and the slip determiner 17 constituting the friction characteristic calculator 65 will be described. The friction characteristic calculator 65 determines whether the drive wheels slip or not. When determining that the drive wheels slip, the friction characteristic calculator 65 derives a control target of the slip ratio (hereinafter referred to as "slip ratio target value") and outputs a torque reduction command to the torque command calculator 20 in order to make the slip ratio equal to the derived slip ratio. This includes the case where the torque reduction command is outputted to reduce torque of either the electric motor 1 or the electric motor 4, and the case where the torque reduction command is outputted to reduce both the torque of the electric motor 1 and the torque of the electric motor 4.

Figure 7:
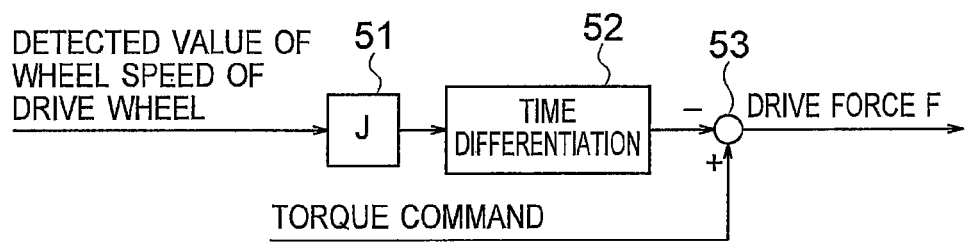
FIG. 7 A view of the configuration of a drive force calculator shown in FIG. 2.

FIG. 7 shows the configuration of the drive force calculator 19. A differentiator 52 outputs a time differential value of the product which is obtained by multiplying the detected value of the wheel speed of each drive wheel by an inertia 51 of the electric motor and the wheel. A subtracter 53 receives, as inputs, the torque command outputted by the torque command calculator 20 and the time differential value outputted by the differentiator 52, and outputs a difference between the inputs as a drive force F.

Figure 8:
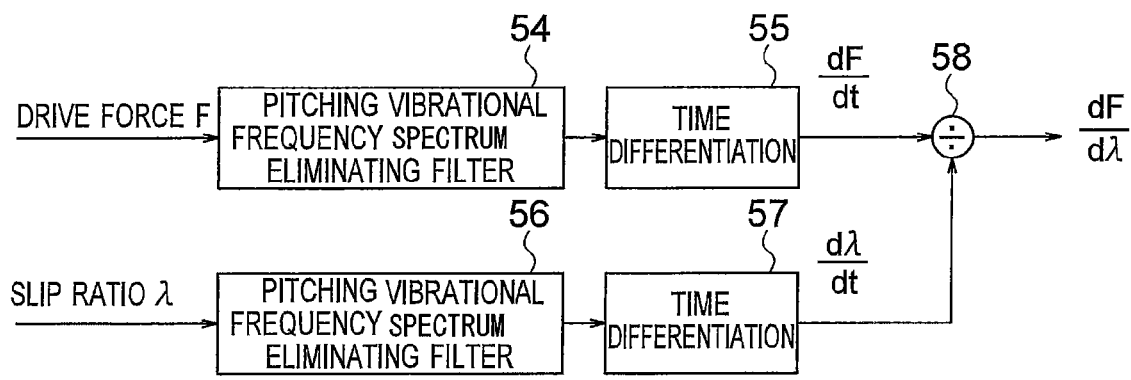
FIG. 8 A view of the configuration of a drive force gradient calculator shown in FIG. 2.

FIG. 8 shows the configuration of the drive force gradient calculator 18. The drive force gradient calculator 18 calculates temporal change rates of the slip ratio λ and the drive force F in FIG. 4 to thereby calculate a gradient of the drive force relative to the slip ratio.

A pitching vibrational frequency spectrum eliminating filter 54 receives, as an input, the drive force F outputted from the drive force calculator 19, and eliminates a pitching vibrational frequency spectrum included in the drive force F. It has been generally known that the pitching vibrational frequency of a dump truck is in the range of about 1 to 3 Hz. Therefore, a band eliminating filter having a filter characteristic, for example, to eliminate only the frequency band of about 1 to 3 Hz can be used as the filter 54. Incidentally, combination of a low-pass filter and a high-pass filter may be used in place of the band eliminating filter. A differentiator 55 receives, as an input, the drive force F outputted from the pitching vibrational frequency spectrum eliminating filter 54, and outputs a time differential value dF/dt.

Similarly, a pitching vibrational frequency spectrum eliminating filter 56 receives, as an input, the slip ratio λ outputted from the slip ratio calculator 21, and eliminates a pitching vibrational frequency spectrum included in the slip ratio λ. Incidentally, a filter having the same characteristic as the filter 54 is used as the filter 56. A differentiator 57 receives, as an input, the slip ratio λ outputted from the pitching vibrational frequency spectrum eliminating filter 56, and outputs a time differential value dλ/dt. A divider 58 divides the value dF/dt outputted by the differentiator 55 by the value dλ/dt outputted by the differentiator 57. Thus, the divider 58 outputs a gradient dF/dλ of the drive force relative to the slip ratio.

The value dF/dλ is positive in a non-slip region and negative in a slip region both during acceleration running and during deceleration running. Accordingly, the slip ratio at a moment when the value dF/dλ changes from positive to negative is a slip ratio at which the drive force can be maximized during acceleration running or the brake force can be maximized during deceleration running.

When the value dF/dλ outputted by the drive force gradient calculator 18 is positive, the slip determiner 17 determines that each drive wheel does not slip, and therefore does not correct the torque command. At the moment when the value dF/dλ changes from positive to negative for the first time, the slip determiner 17 determines that each drive wheel slips, and outputs a torque reduction command to correct the torque command so that the slip ratio can be equal to the slip ratio at which the slip is determined. Incidentally, the slip determination method is not limited to the moment when the value dF/dλ changes from positive to negative for the first time. For example, determination may be made that each drive wheel slips at a moment when the value dF/dλ exceeds a predetermined threshold.

Figure 9:
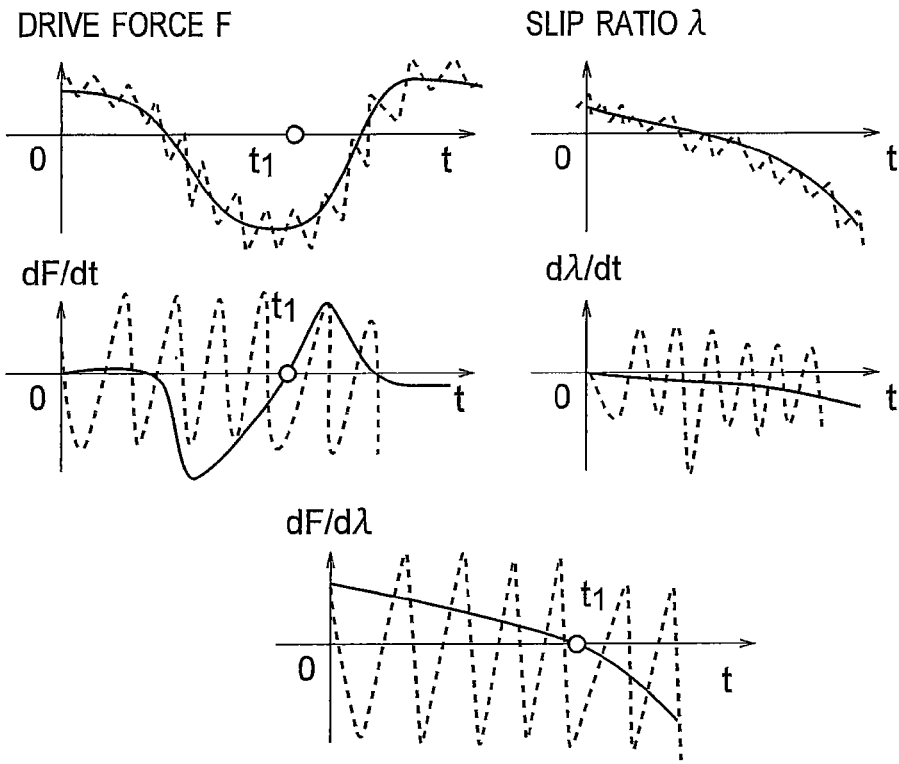
FIG. 9 A view of comparison between the first embodiment of the invention and the background art (in drive force F, slip ratio λ, dF/dt, dλ/dt and dF/dλ).

FIG. 9 shows comparison between the background art and the first embodiment of the invention as to waveforms of the drive force F, the slip ratio λ and the respective time differential values dF/dt, dλ/dt and dF/dλ during deceleration running. Pitching vibration is largely included in the waveforms of the drive force F and the slip ratio λ in the background art. Accordingly, when the drive force F and the slip ratio λ are differentiated by time, both the values dF/dt and dλ/dt fluctuate largely in the positive and negative directions so that the value dF/dλ cannot be calculated accurately. Therefore, a slip ratio at which the brake force can be maximized cannot be derived so that the slip ratio cannot be controlled to be equal to an appropriate slip ratio target value. On the other hand, pitching vibration included in each of the drive force F and the slip ratio λ is eliminated in the embodiment. Accordingly, noise is not included in each of the time differential waveforms so that an accurate value dF/dλ can be outputted.

As described above, according to the dump truck according to the first embodiment, even when the pitching vibrational frequency spectrum of the vehicle body is included in each of the waveforms of the slip ratio and the drive force, the value dF/dλ can be calculated accurately. A slip ratio at which the drive force can be maximized during acceleration running or the brake force can be maximized during deceleration running can be derived so that torque can be controlled so as to achieve the derived slip ratio.

The aforementioned first embodiment may be modified variously. Accordingly, various modifications will be described below.

[Modification 1]

In Modification 1, a signal detected by a weight sensor (weight detector) 90 provided in the dump truck is inputted to a drive force gradient calculator 18'. The weight sensor 90 serves for detecting the weight of cargo loaded on the vessel V. Incidentally, any other sensor than the weight sensor 90 may be used as long as the sensor can detect the load of the vessel V.

Figure 11:
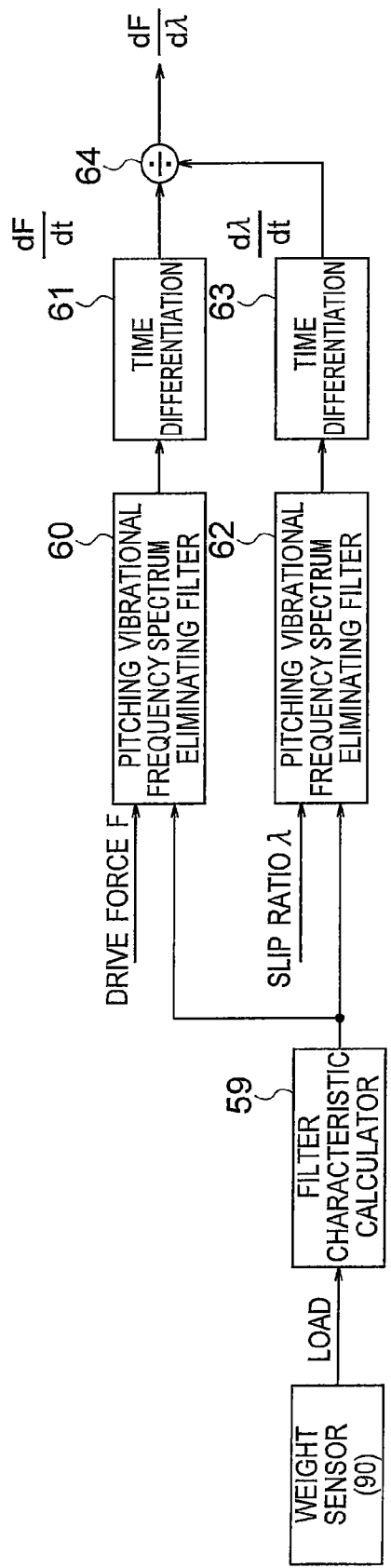
FIG. 11 A view of the configuration of a drive force gradient calculator according to Modification 1.

FIG. 11 shows the configuration of the drive force gradient calculator 18' when the change of the load is taken into consideration. A filter characteristic calculator 59 receives, as an input, a load detected by the weight sensor 90, and calculates a pitching vibrational frequency of the vehicle body. A pitching vibrational frequency spectrum eliminating filter 60 receives a drive force F as an input, and eliminates the pitching vibrational frequency calculated by the filter characteristic calculator 59 from the drive force F. A differentiator 61 receives, as an input, the drive force F outputted from the pitching vibrational frequency spectrum eliminating filter 60, and outputs a time differential value dF/dt.

Similarly, a pitching vibrational frequency spectrum eliminating filter 62 receives a slip ratio λ as an input, and eliminates the pitching vibrational frequency calculated by the filter characteristic calculator 59 from the slip ratio λ. A differentiator 63 receives, as an input, the slip ratio λ outputted from the pitching vibrational frequency spectrum eliminating filter 62, and outputs a time differential value dλ/dt. A divider 64 divides the value dF/dt outputted by the differentiator 61 by the value dλ/dt outputted by the differentiator 63. Thus, the divider 54 outputs a value dF/dλ corresponding to the gradient in FIG. 4.

Figure 10:
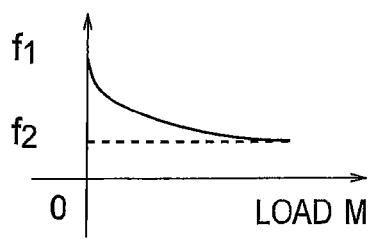
FIG. 10 A view of the relation between a load and a pitching vibrational frequency.

Next, the filter characteristic calculator 59 will be described. FIG. 10 shows the relation between the load and the pitching vibrational frequency. A natural frequency of the vehicle body is calculated based on a motion equation of the vehicle body and a pitching vibrational frequency corresponding to the load is obtained and drawn as a curved line in FIG. 10.

Figure 12:
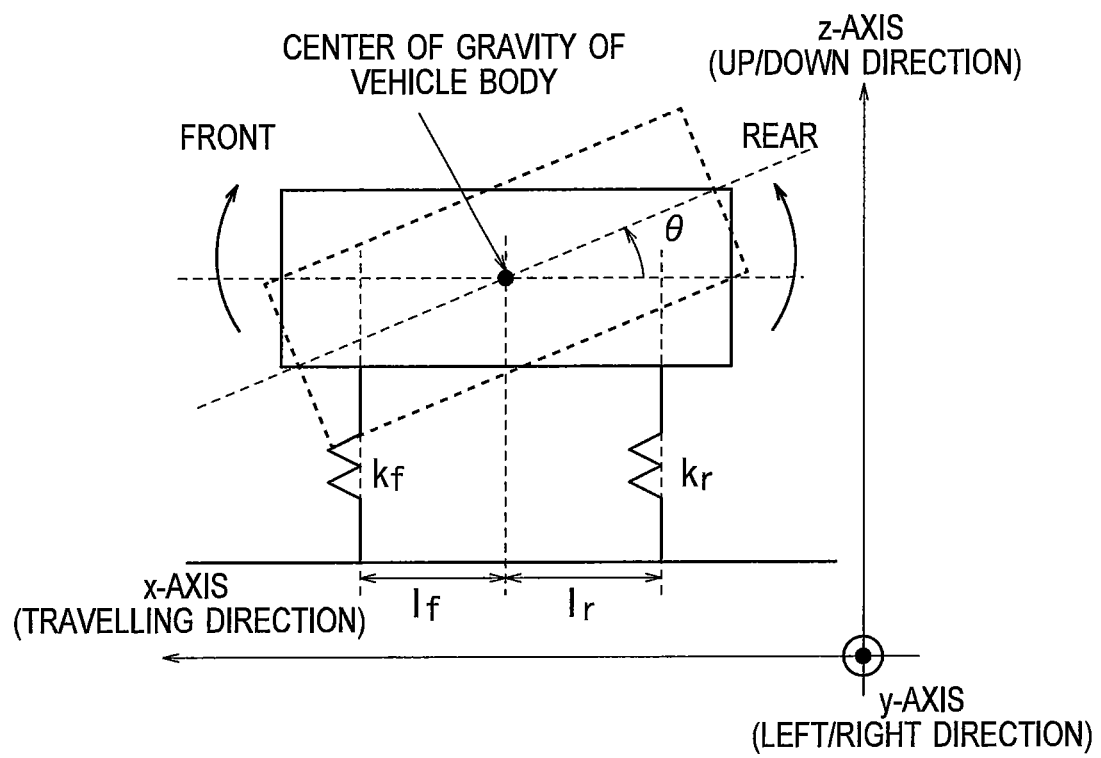
FIG. 12 A schematic view of pitching vibration of the vehicle body.

FIG. 12 shows a vibration model of the vehicle body. The vibration model shown in FIG. 12 is a simple model in which the vehicle body is divided into a sprung part and an unsprung part. Assume that a pitch angle is denoted by θ. In this case, the motion equation of the vehicle body can be expressed by the following formula.

[Number 4]

$$Iy\ddot{\theta} = -2(kflf^2 + krlr^2)\theta \qquad (4)$$

in which $I_y$ is the moment of inertia in a y-axis direction and generally proportional to the load, $k_f$ and $k_r$ are spring constants of front and rear wheels, and $I_f$ and $I_r$ are distances in an x-axis direction from the center of gravity of the vehicle body to the front and rear wheels.

Assume now that the natural frequency of the vehicle body is denoted by $\underline{f}$. In this case, the natural frequency $\underline{f}$ can be expressed by the following formula from the numerical formula (4).

[Number 5]

$$f = \frac{1}{2\pi}\sqrt{\frac{2(kflf^2 + krlr^2)}{Iy}} \qquad (5)$$

By use of the numerical formula (5), the filter characteristic calculator 59 can calculate a pitching vibrational frequency spectrum corresponding to the load. Incidentally, since $I_y$ is in the denominator according to the numerical formula (5), it can be known that the natural frequency $\underline{f}$ of the vehicle body decreases as the load increases. That is, the filter characteristic calculator 59 calculates the pitching vibrational frequency of the vehicle body so that the pitching vibrational frequency of the vehicle body can decrease as the value of the load increases.

From the above description, even when the pitching vibrational frequency changes in accordance with the change of the load, the dump truck according to Modification 1 can eliminate the pitching vibrational frequency spectrum, derive a slip ratio at which the drive force can be maximized during acceleration running or the brake force can be maximized during deceleration running, and control torque so as to achieve the derived slip ratio.

[Modification 2]

In Modification 2, a signal detected by the weight sensor (weight detector) 90 provided in the dump truck is inputted to a drive force gradient calculator 18". The weight sensor 90 serves for detecting the weight of cargo loaded on the vessel V. Incidentally, any other sensor than the weight sensor 90 may be used as long as the sensor can detect the load of the vessel V.

Figure 13:
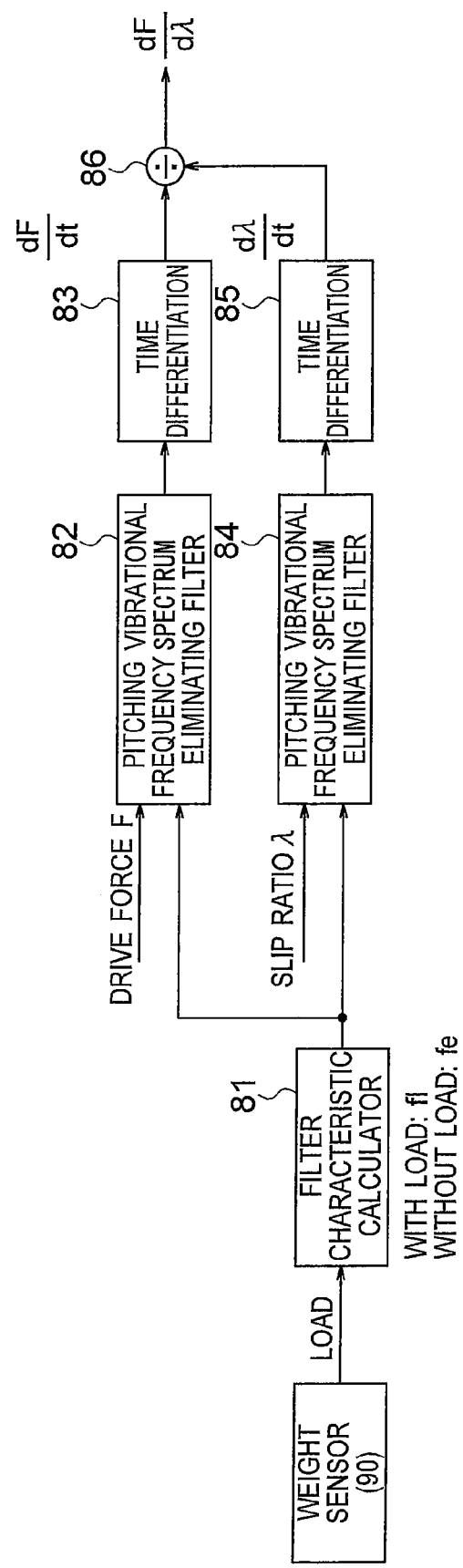
FIG. 13 A view of the configuration of a drive force gradient calculator according to Modification 2.

FIG. 13 shows the configuration of the drive force gradient calculator 18" when the change of the load is taken into consideration. A filter characteristic calculator 81 receives the load as an input from the weight sensor 90, and selects a pitching vibrational frequency of the vehicle body from predetermined numerical values.

The filter characteristic calculator 81 determines whether the value of the load of the vessel V inputted from the weight sensor 90 is smaller than a predetermined threshold or not. When the value of the load is not smaller than the predetermined threshold, the filter characteristic calculator 81 regards that cargo is loaded on the vessel V. Accordingly, the filter characteristic calculator 81 outputs a pitching vibrational frequency $f_l$ (first pitching vibrational frequency). On the other hand, when the value of the load is smaller than the threshold, the filter characteristic calculator 81 regards that no cargo is loaded on the vessel V. Accordingly, the filter characteristic calculator 81 outputs a pitching vibrational frequency $f_e$ (second pitching vibrational frequency).

In the case of the dump truck, the vessel V is often either fully loaded with cargo or empty. In Modification 2, focusing on this fact, the filter characteristic calculator 81 can selectively output the pitching vibrational frequency $f_l$ when there is a load and the pitching vibrational frequency $f_e$ when there is no load, based on the input from the weight sensor 90.

A pitching vibrational frequency spectrum eliminating filter 82 receives a drive force F as an input, and eliminates the pitching vibrational frequency selected by the filter characteristic calculator 81 from the drive force F. A differentiator 83 receives, as an input, the drive force F outputted from the pitching vibrational frequency spectrum eliminating filter 82, and outputs a time differential value dF/dt.

Similarly, a pitching vibrational frequency spectrum eliminating filter 84 receives a slip ratio λ as an input, and eliminates the pitching vibrational frequency selected by the filter characteristic calculator 81 from the slip ratio λ. A differentiator 63 receives, as an input, the slip ratio λ outputted from the pitching vibrational frequency spectrum eliminating filter 62, and outputs a time differential value dλ/dt. A divider 64 divides the value dF/dt outputted by the differentiator 61 by the value dλ/dt outputted by the differentiator 63. Thus, the divider 64 outputs a value dF/dλ corresponding to the gradient in FIG. 4.

From the above description, even when the pitching vibrational frequency changes in accordance with the change of the load, the dump truck according to Modification 2 can eliminate the pitching vibrational frequency spectrum, derive a slip ratio at which the drive force can be maximized during acceleration running or the brake force can be maximized during deceleration running, and control torque so as to achieve the derived slip ratio. According to Modification 2, a pitching vibrational frequency to be outputted can be selected in accordance with load/unload of cargo. Thus, there is an advantage that control of the wheel speeds can be simplified.

[Modification 3]

Figure 14:
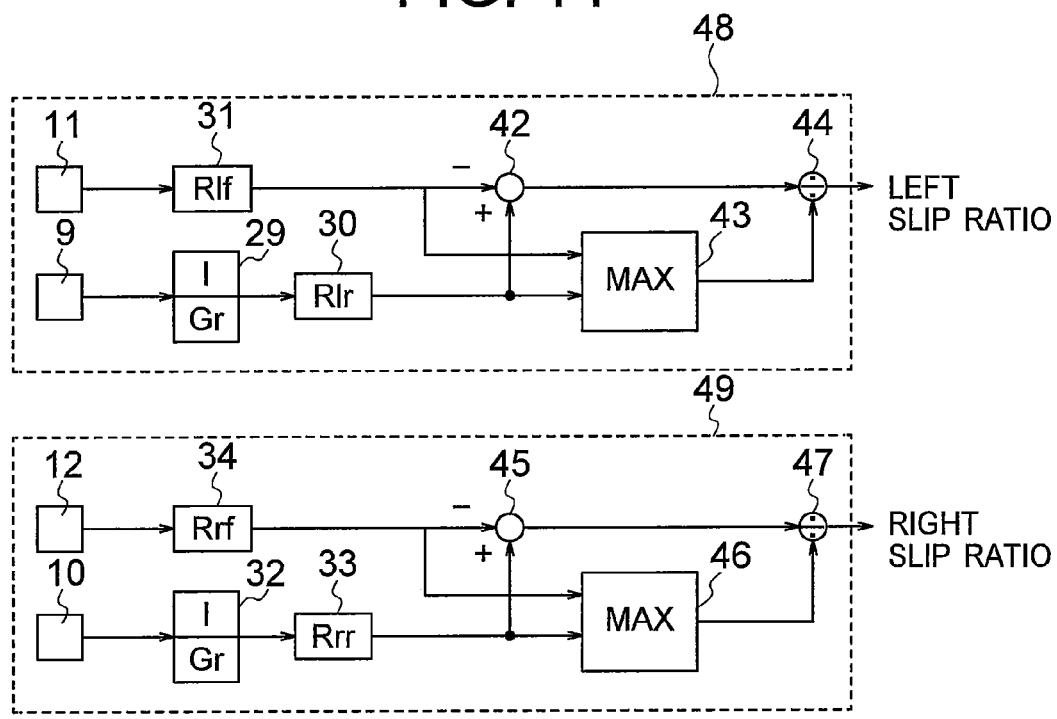
FIG. 14 A view of the configuration of a slip ratio calculator according to Modification 3.

Modification 3 has a configuration in which a left wheel slip ratio and a right wheel slip ratio are calculated separately. The configuration of each of slip ratio calculators according to the Modification 3 is shown in FIG. 14.

A left wheel slip ratio calculator 48 receives, as inputs, the detected values of the rotation speeds outputted by the speed detector 9 and the speed detector 11, and calculates a slip ratio for the wheel 3 as a drive wheel and the wheel 7 as a driven wheel. The gain 29 receives, as an input value, the rotation speed of the electric motor 1 outputted by the speed detector 9, and multiplies the input value by a gain given as the reciprocal of the gear ratio Gr of the gear 2. Thus, the gain 29 outputs a detected value of a rotation speed of the wheel 3. The gain 30 receives, as an input, the detected value of the rotation speed of the wheel 3 outputted by the gain 29, and multiplies the input by the radium $R_{lr}$ of the wheel 3. Thus, the gain 30 outputs a detected value of a wheel speed of the wheel 3. The gain 31 receives, as an input, the detected value of the rotation speed of the wheel 7 outputted by the speed detector 11, and multiplies the input by the radium $R_{lf}$ of the wheel 7. Thus, the gain 31 outputs a detected value of a wheel speed of the wheel 7.

Consider now that the detected value of the wheel speed of the wheel 7 represents an actual vehicle speed because the wheel 7 is a driven wheel. A subtracter 42 receives, as inputs, the detected value of the wheel speed of the drive wheel and the detected value of the wheel speed of the driven wheel, and outputs a difference between the inputs. A maximum value selector 43 receives, as inputs, the detected value of the wheel speed of the drive wheel and the detected value of the wheel speed of the driven wheel, and outputs a larger one of the inputs. A divider 44 divides the output of the subtracter 42 by the output of the maximum value selector 43. Thus, the divider 44 outputs a left wheel slip ratio. Incidentally, when the outputted left wheel slip ratio is represented by a formula, the formula will be the aforementioned numerical formula (1).

On the other hand, a right wheel slip ratio calculator 49 receives, as inputs, the detected values of the rotation speeds outputted by the speed detector 10 and the speed detector 12, and calculates a slip ratio for the wheel 6 as a drive wheel and the wheel 8 as a driven wheel. The gain 32 receives, as an input, the detected value of the rotation speed of the electric motor 4 outputted by the speed detector 10, and multiplies the input by a gain given as the reciprocal of the gear ratio Gr of the gear 5. Thus, the gain 32 outputs a detected value of a rotation speed of the wheel 6. The gain 33 receives, as an input, the detected value of the rotation speed of the wheel 6 outputted by the gain 32, and multiplies the input by the radium $R_{rr}$ of the wheel 6. Thus, the gain 33 outputs a detected value of a wheel speed of the wheel 6. The gain 34 receives, as an input, the detected value of the rotation speed of the wheel 8 outputted by the speed detector 12, and multiplies the input by the radium $R_{rf}$ of the wheel 8. Thus, the gain 34 outputs a detected value of a wheel speed of the wheel 8.

Consider now that the detected value of the wheel speed of the wheel 8 represents an actual vehicle speed because the wheel 8 is a driven wheel. A subtracter 45 receives, as inputs, the detected value of the wheel speed of the drive wheel and the detected value of the wheel speed of the driven wheel, and outputs a difference between the inputs. A maximum value selector 46 receives, as inputs, the detected value of the wheel speed of the drive wheel and the detected value of the wheel speed of the driven wheel, and outputs a larger one of the inputs. A divider 47 divides the output of the subtracter 45 by the output of the maximum value selector 46. Thus, the divider 47 outputs a right wheel slip ratio. Incidentally, when the outputted right wheel slip ratio is represented by a formula, the formula will be the aforementioned numerical formula (1).

From the above description, the dump truck according to Modification 3 can calculate the left wheel slip ratio and the right wheel slip ratio separately to control torques of the drive wheels 3 and 6 independently and separately for the left and right. Accordingly, the dump truck according to Modification 3 can control the rotation speeds of the wheels with higher accuracy. In addition, according to Modification 3, even when, for example, either the left wheel speed detectors 9 and 10 or the right wheel speed detectors 11 and 12 break down, the slip ratio can be calculated. Accordingly, even when some of the speed detectors break down, control of the rotation speeds of the wheels can be continued.

[Modification 4]

Figure 15:
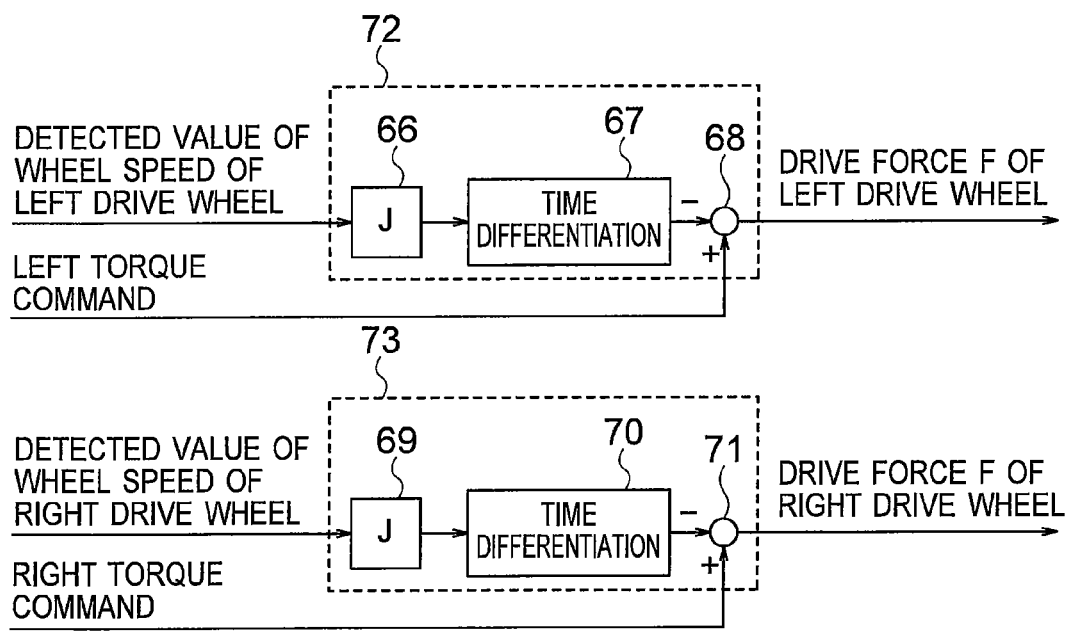
FIG. 15 A view of the configuration of a drive force calculator according to Modification 4.

Modification 4 has a configuration in which a drive force of the left drive wheel and a drive force of the right drive wheel are calculated separately. The configuration of each of drive force calculators according to the Modification 4 is shown in FIG. 15.

A drive force calculator 72 serves for calculating a drive force F of the left drive wheel. A differentiator 67 outputs a time differential value of the product which is obtained by multiplying a detected value of the wheel speed of the left drive wheel by an inertia 66 of the electric motor and the wheel. A subtracter 68 receives, as inputs, a left drive wheel torque command outputted by the torque command calculator 20 and the time differential value outputted by the differentiator 67, and outputs a difference between the inputs.

On the other hand, a drive force calculator 73 serves for calculating a drive force F of the right drive wheel. A differentiator 70 outputs a time differential value of the product which is obtained by multiplying a detected value of the wheel speed of the right drive wheel by an inertia 69 of the electric motor and the wheel. A subtracter 71 receives, as inputs, a right drive wheel torque command outputted by the torque command calculator 20 and the time differential value outputted by the differentiator 70, and outputs a difference between the inputs as the drive force F of the right drive wheel.

From the above description, the dump truck according to Modification 4 can calculate the drive force of the left drive wheel and the drive force of the right drive wheel separately to control torques of the drive wheels 3 and 6 independently and separately for the left and right. Accordingly, the dump truck according to Modification 4 can control the rotation speeds of the wheels with higher accuracy. In addition, according to Modification 4, even when, for example, either the left wheel speed detectors 9 and 10 or the right wheel speed detectors 11 and 12 break down, the drive force can be calculated. Accordingly, even when some of the speed detectors break down, control of the rotation speeds of the wheels can be continued.

[Dump Truck According to Second Embodiment]

Successively, a dump truck according to a second embodiment of the invention will be described with reference to the drawings. Incidentally, the second embodiment is different from the first embodiment in the point that the filters in the first embodiment eliminate the pitching vibrational frequency spectrum included in the drive force F and the slip ratio λ whereas filters in the second embodiment eliminate a pitching vibrational frequency spectrum included in detected values of the wheel speeds of the wheels. In other words, the second embodiment is different from the first embodiment in the point that the filters in the first embodiment are provided in the drive force gradient calculator whereas the filters in the second embodiment are provided in a slip ratio calculator. Accordingly, the different point will be mainly explained in the following description and description about the same constituent members as those in the first embodiment will be omitted. Incidentally, the same constituent members as those in the first embodiment are referred to by the same numerals correspondingly in the drawing.

Figure 16:
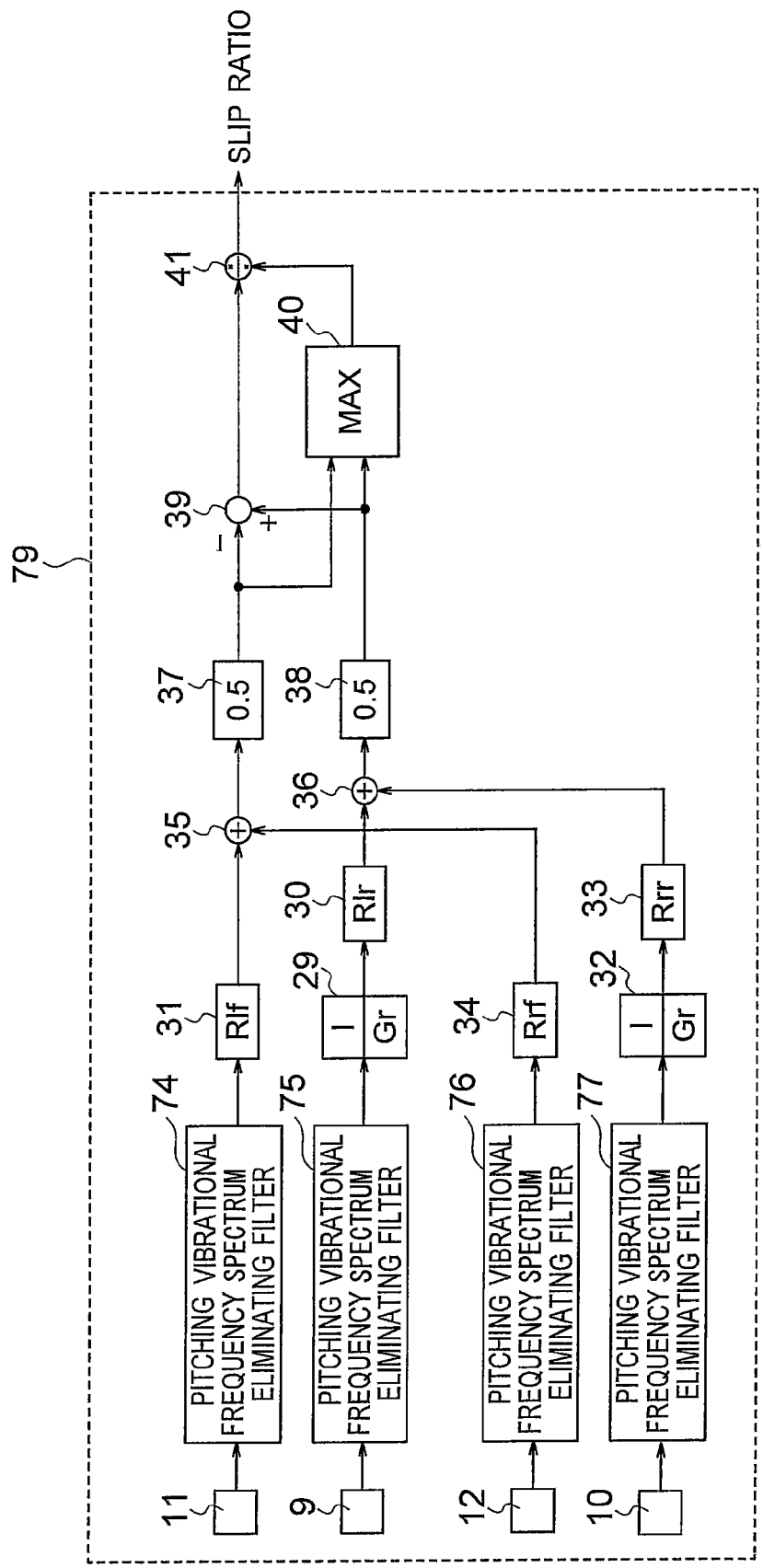
FIG. 16 A view of the configuration of a slip ratio calculator of a dump truck according to a second embodiment of the invention.

FIG. 16 shows the configuration of a slip ratio calculator 79 in the dump truck according to the second embodiment. As shown in FIG. 16, pitching vibrational frequency spectrum eliminating filters 74, 75, 76 and 77 are disposed in the slip ratio calculator 79 respectively for detected values of the wheel speeds of the wheels 3, 6,7 and 8 outputted from the speed detectors 9, 10, 11 and 12. A pitching vibrational frequency spectrum included in the detected values of the wheel speeds is eliminated by the pitching vibrational frequency spectrum eliminating filters 74, 75, 76 and 77 respectively. The slip ratio calculator 79 receives, as inputs, an average value of the wheel speeds of the left and right driven wheels 7 and 8 and an average value of the wheel speeds of the left and right drive wheels 3 and 6 from each of which the pitching vibrational frequency spectrum has been eliminated, and calculates a slip ratio.

Thus, in the second embodiment, even when the pitching vibrational frequency spectrum of the vehicle body is included in the detected values of the wheel speeds, that frequency spectrum can be eliminated by the filters. Accordingly, it is possible to calculate the slip ratio accurately, derive a slip ratio at which the drive force can be maximized during acceleration running or the brake force can be maximized during deceleration running, and control torque so as to achieve the derived slip ratio.

Incidentally, the pitching vibrational frequency spectrum eliminating filters 74, 75, 76 and 77 are band eliminating filters each having a filter characteristic to eliminate only a frequency bandwidth of about 1 to 3 Hz. This is because the pitching vibrational frequency of the dump truck is about 1 to 3 Hz. It is a matter of course that combinations of low-pass filters and high-pass filters may be used in place of the band eliminating filters.

The aforementioned second embodiment can be modified variously. Therefore, various modifications will be described below.

[Modification 5]

In Modification 5, a signal detected by the weight sensor (weight detector) 90 provided in the dump truck is inputted to a slip ratio calculator 80. This weight sensor 90 serves for detecting the weight of cargo loaded on the vessel V. Incidentally, any other sensor than the weight sensor 90 may be used as long as the sensor can detect the load of the vessel V.

Figure 17:
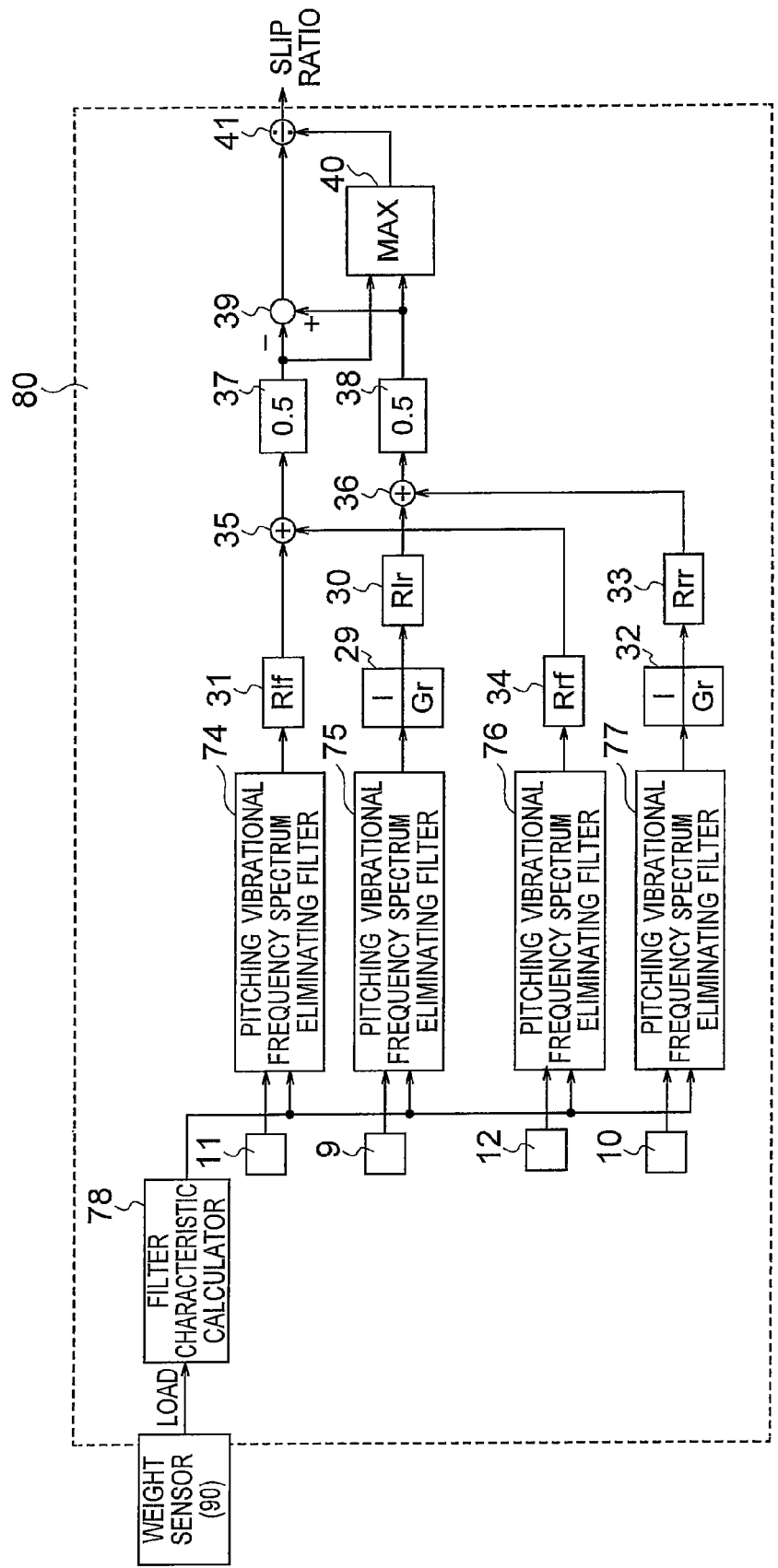
FIG. 17 A view of the configuration of a slip ratio calculator according to Modification 5.

FIG. 17 shows the configuration of the slip ratio calculator 80 when the change of the load is taken into consideration. A filter characteristic calculator 78 receives the load as an input from the weight sensor 90, and calculates a pitching vibrational frequency of the vehicle body by use of the aforementioned numerical formula (5). According to the numerical formula (5), $I_y$ is in the denominator so that it can be known that the natural frequency $\underline{f}$ of the vehicle body decreases as the load increases. That is, the filter characteristic calculator 78 calculates the pitching vibrational frequency of the vehicle body so that the pitching vibrational frequency of the vehicle body can decrease as the value of the load increases. The pitching vibrational frequency spectrum eliminating filters 74, 75, 76 and 77 eliminate the pitching vibrational frequency spectrum calculated by the filter characteristic calculator 78 from the detected values of the wheel speeds. The slip ratio calculator 80 receives, as inputs, an average value of the wheel speeds of the left and right driven wheels 7 and 8 and an average value of the wheel speeds of the left and right drive wheels 3 and 6 from each of which the pitching vibrational frequency spectrum has been eliminated, and calculates a slip ratio.

From the above description, even when the pitching vibrational frequency changes in accordance with the change of the load, the dump truck according to Modification 5 can eliminate the pitching vibrational frequency spectrum, derive a slip ratio at which the drive force can be maximized during acceleration running or the brake force can be maximized during deceleration running, and control torque so as to achieve the derived slip ratio.

[Modification 6]

In Modification 6, a signal detected by the weight sensor (weight detector) 90 provided in the dump truck is inputted to a slip ratio calculator 88. This weight sensor 90 serves for detecting the weight of cargo loaded on the vessel V. Incidentally, any other sensor than the weight sensor 90 may be used as long as the sensor can detect the load of the vessel V.

Figure 18:
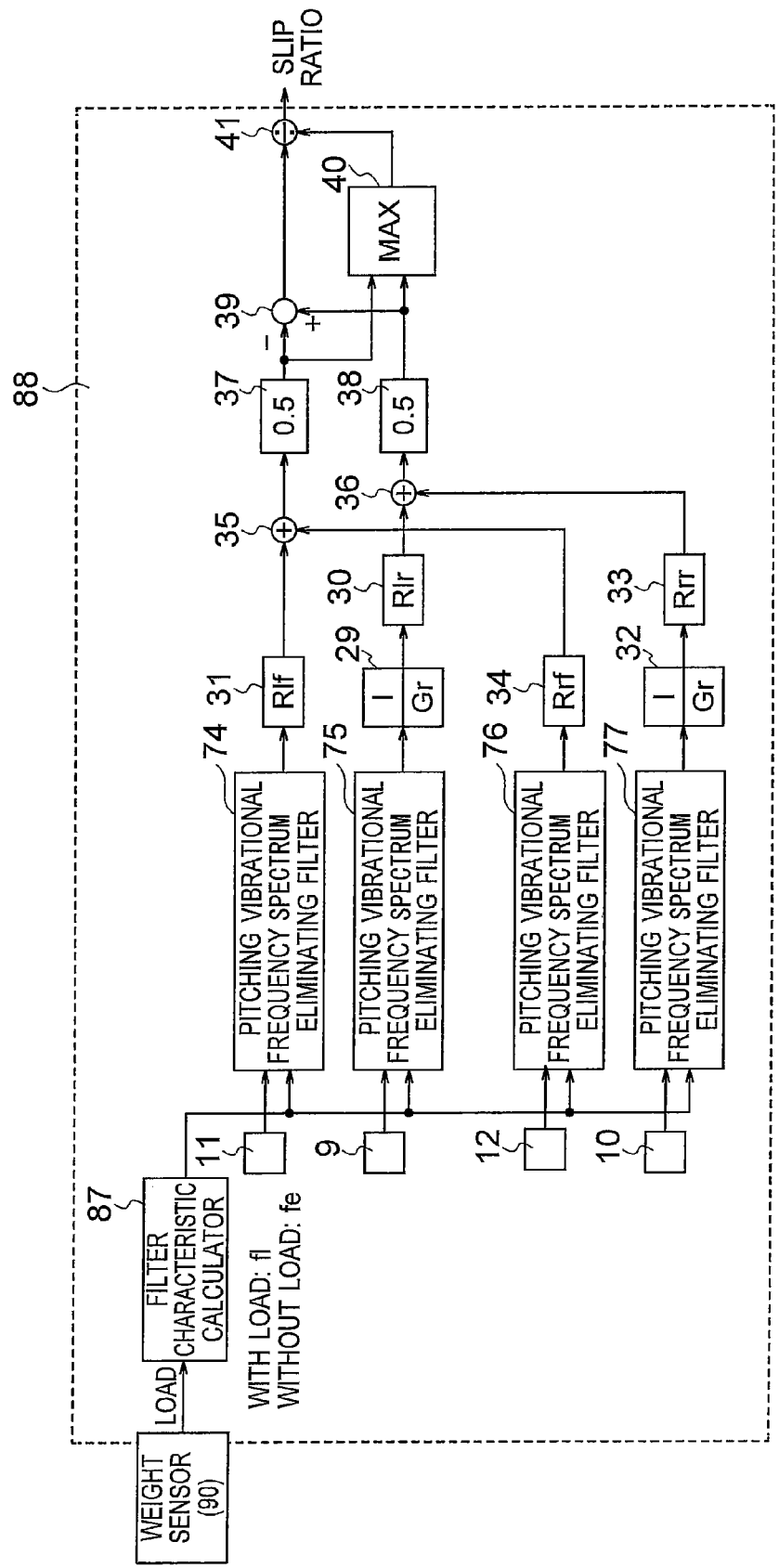
FIG. 18 A view of the configuration of a slip ratio calculator according to Modification 6.

FIG. 18 shows the configuration of the slip ratio calculator 88 when the change of the load is taken into consideration. A filter characteristic calculator 87 determines whether the value of the load of the vessel V inputted from the weight sensor 90 is smaller than a predetermined threshold or not. When the value of the load is not smaller than the threshold, the filter characteristic calculator 87 regards that cargo is loaded on the vessel V. Therefore, the filter characteristic calculator 87 outputs a pitching vibrational frequency $f_l$ (first pitching vibrational frequency). On the other hand, when the value of the load is smaller than the threshold, the filter characteristic calculator 87 regards that cargo is not loaded on the vessel V. Therefore, the filter characteristic calculator 87 outputs a pitching vibrational frequency $f_e$ (second pitching vibrational frequency).

In the case of the dump truck, the vessel V is often either fully loaded with cargo or empty. In Modification 6, focusing on this fact, the filter characteristic calculator 87 can selectively output the pitching vibrational frequency $f_l$ or the pitching vibrational frequency $f_e$ based on the input from the weight sensor 90.

The pitching vibrational frequency spectrum eliminating filters 74, 75, 76 and 77 eliminate the pitching vibrational frequency spectrum selected by the filter characteristic calculator 78 from the detected values of the wheel speeds respectively. The slip ratio calculator 88 receives, as inputs, an average value of the wheel speeds of the left and right driven wheels 7 and 8 and an average value of the wheel speeds of the left and right drive wheels 3 and 6 from each of which the pitching vibrational frequency spectrum has been eliminated, and calculates a slip ratio.

From the above description, even when the pitching vibrational frequency changes in accordance with the change of the load, the dump truck according to Modification 6 can eliminate the pitching vibrational frequency spectrum, derive a slip ratio at which the drive force can be maximized during acceleration running or the brake force can be maximized during deceleration running, and control torque so as to achieve the derived slip ratio. In addition, according to Modification 6, a pitching vibrational frequency to be outputted can be selected in accordance with load/unload of cargo. Thus, there is an advantage that control of the wheel speeds can be simplified.

[Modification 7]

Figure 19:
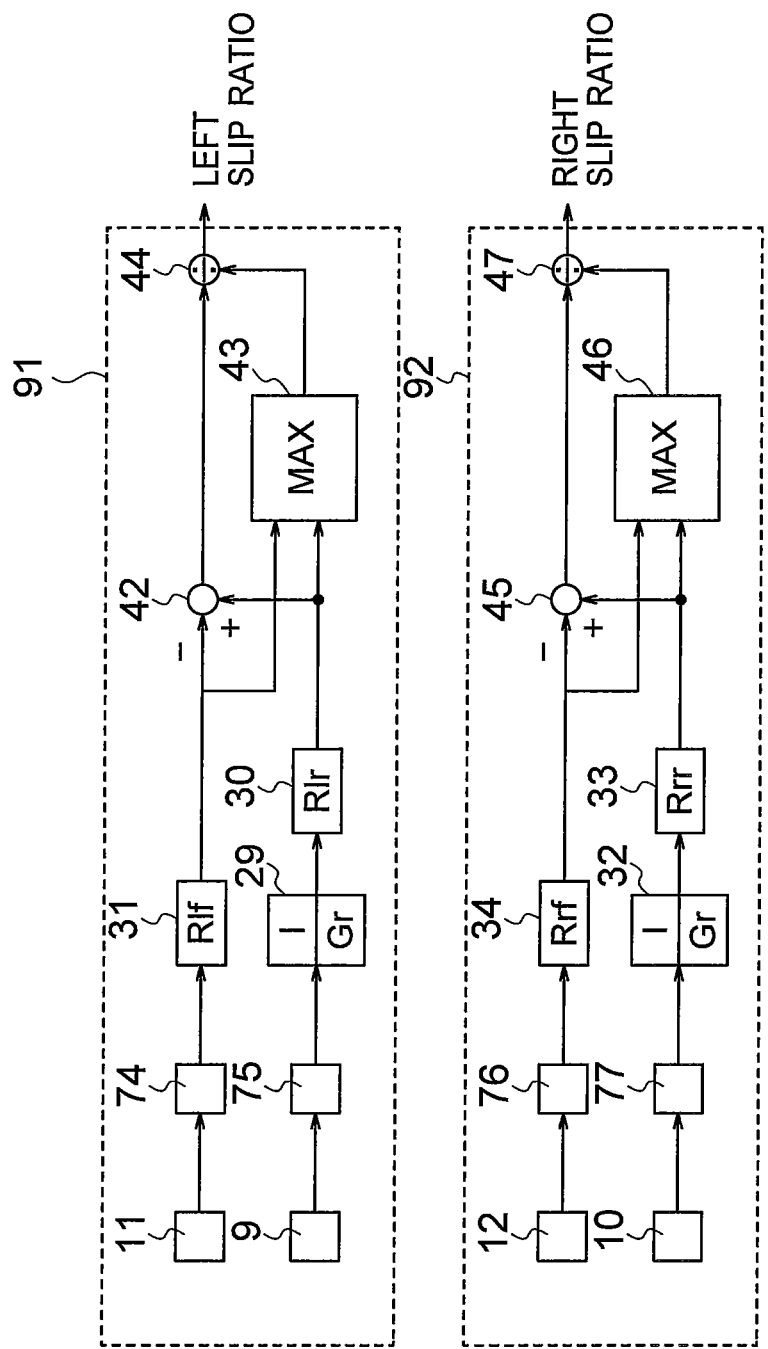
FIG. 19 A view of the configuration of a slip ratio calculator according to Modification 7.

The damp truck according to the second embodiment may have a configuration in which a left wheel slip ratio and a right wheel slip ratio are calculated separately. In this case, as shown in FIG. 19, a pitching vibrational frequency spectrum eliminating filter 74 is disposed between the speed detector 11 and the gain 31 and a pitching vibrational frequency spectrum eliminating filter 75 is disposed between the speed detector 9 and the gain 29 in a left wheel slip ratio calculator 91. In addition, a pitching vibrational frequency spectrum eliminating filter 76 is disposed between the speed detector 12 and the gain 34 and a pitching vibrational frequency spectrum eliminating filter 77 is disposed between the speed detector 10 and the gain 32 in a right wheel slip ratio calculator 92.

The slip ratio calculator 91 can calculate a left wheel slip ratio by use of the detected values of the wheel speeds from which the pitching vibrational frequency spectrum has been eliminated by the pitching vibrational frequency spectrum eliminating filters 74 and 75 respectively. Likewise, the slip ratio calculator 92 can calculate a right wheel slip ratio.

From the above description, the dump truck according to Modification 7 can calculate the left wheel slip ratio and the right wheel slip ratio separately, and control torques of the drive wheels 3 and 6 independently and separately for the left and right. Accordingly, the dump truck according to Modification 7 can control the rotation speeds of the wheels with higher accuracy. In addition, according to Modification 7, even when either the left wheel speed detectors 9 and 10 or the right wheel speed detectors 11 and 12 break down, the slip ratio can be calculated. Accordingly, even when some of the speed detectors break down, control of the rotation speeds of the wheels can be continued.

REFERENCE SIGNS LIST

1, 4 . . . electric motor, 2, 5 . . . gear, 3, 6 . . . wheel (drive wheel), 7, 8 . . . wheel (driven wheel), 9, 10, 11, 12 . . . speed detector, 13 . . . power converter, 14, 15 . . . current detector, 16 . . . torque controller, 17 . . . slip determiner (slip determination unit), 18, 18', 18" . . . drive force gradient calculator (drive force gradient calculation unit), 19, 72, 73 . . . drive force calculator, 20 . . . torque command calculator (torque command calculation unit), 21, 48, 49, 79, 80, 88, 91, 92 . . . slip ratio calculator (slip ratio calculation unit), 22 . . . accelerator opening detector, 23 . . . brake opening detector, 24 . . . steering angle detector, 25, 26, 27, 28 . . . load detector, 29, 30, 31, 32, 33, 34, 37, 38 . . . gain, 35, 36 . . . adder, 39, 42, 45 . . . subtracter, 40, 43, 46 . . . maximum value selector, 41, 44, 47, 58, 64, 86 . . . divider, 50 . . . electric motor controller, 51, 66, 69 . . . inertial of electric motor (electric motor-side converted value), 52, 55, 57, 61, 63, 67, 70, 83, 95 . . . differentiator, 53, 68, 71 . . . subtracter, 54, 56, 60, 62, 74, 75, 76, 77, 82, 84 . . . pitching vibrational frequency spectrum eliminating filter (filter), 59, 78, 81, 87 . . . filter characteristic calculator (filter characteristic calculation unit), 65 . . . friction characteristic calculator, 90 . . . weight sensor (weight detector)

The invention claimed is:

1. An electric drive vehicle comprising: electric motors; drive wheels which are driven or braked by the electric motors; driven wheels which are driven by rotation of the drive wheels; an electric motor controller which controls the electric motors; and speed detectors which detect wheel speeds of the drive wheels and the driven wheels; wherein: the electric motor controller has:
a slip ratio calculation unit which calculates a slip ratio of the drive wheels from detected values of the wheel speeds detected by the speed detectors;
a torque command calculation unit which calculates a torque command for the drive wheels;
a drive force calculation unit which calculates a drive force to be generated in the drive wheels, from the detected value of the wheel speed of the drive wheels and the torque command for the drive wheels;
a filter which eliminates a pitching vibrational frequency spectrum of a vehicle body included in each of the slip ratio and the drive force; and
the electric motor controller controls the electric motors based on numerical values of the slip ratio and the drive force in each of which the pitching vibrational frequency spectrum of the vehicle body has been eliminated by the filter so as to control a torque of the drive wheels.

2. An electric drive vehicle according to claim 1, wherein: the filter has a filter characteristic to eliminate the pitching vibration of the vehicle body with frequency spectrum of 1 to 3 Hz.

3. An electric drive vehicle according to claim 1, further comprising:
a weight detector which detects a load of cargo; and a filter characteristic calculation unit which calculates the pitching vibrational frequency spectrum of the vehicle body based on a value of the load detected by the weight detector;
wherein:
the filter eliminates the pitching vibrational frequency spectrum of the vehicle body calculated by the filter characteristic calculation unit.

4. An electric drive vehicle according to claim 3, wherein: the filter characteristic calculation unit calculates a pitching vibrational frequency of the vehicle body so that the pitching vibrational frequency of the vehicle body can decrease as the value of the load increases.

5. An electric drive vehicle according to claim 3, wherein: a threshold for determining whether the cargo is loaded or not is set in advance; and the filter characteristic calculation unit outputs a first pitching vibrational frequency when the value of the load detected by the weight detector is not smaller than the threshold while the filter characteristic calculation unit outputs a second pitching vibrational frequency when the value of the load detected by the weight detector is smaller than the threshold.

6. An electric drive vehicle according to claim 1, further comprising:
a drive force gradient calculation unit which calculates a gradient of the drive force relative to the slip ratio from the slip ratio and the drive force in each of which the pitching vibrational frequency spectrum of the vehicle body has been eliminated by the filter;
and a slip determination unit which makes slip determination based on the gradient of the drive force relative to the slip ratio, the gradient being calculated by the drive force gradient calculation unit.

7. An electric drive vehicle according to claim 6, wherein:
the slip determination unit determines that the drive wheels slip when the gradient of the drive force relative to the slip ratio calculated by the drive force gradient calculation unit changes from positive to negative for the first time during acceleration or deceleration running.

8. An electric drive vehicle according to claim 6, wherein:
the slip determination unit determines that the drive wheels slip when the gradient of the drive force relative to the slip ratio calculated by the drive force gradient calculation unit exceeds a predetermined threshold for the first time during acceleration or deceleration running.

9. An electric drive vehicle according to claim 6, wherein:
when the slip determination unit makes the slip determination, the torque command calculation unit adds a torque reduction command to the torque command so as to make the slip ratio equal to the slip ratio at the time of the slip determination.

10. An electric drive vehicle comprising:
electric motors;
drive wheels which are driven or braked by the electric motors;
driven wheels which are driven by rotation of the drive wheels;
an electric motor controller which controls the electric motors; and
speed detectors which detect wheel speeds of the drive wheels and the driven wheels; wherein:
the electric motor controller has:
a filter which eliminates a pitching vibrational frequency spectrum of a vehicle body included in each of detected values of the wheel speeds detected by the speed detectors; and
a slip ratio calculation unit which calculates a slip ratio of the drive wheels from the detected values of the wheel speeds in each of which the pitching vibrational frequency spectrum of the vehicle body has been eliminated by the filter; and
the electric motor controller controls the electric motors based on a numerical value of the slip ratio of the drive wheels which has been calculated by the slip ratio calculation unit so as to control a torque of the drive wheels.

11. An electric drive vehicle according to claim 10, wherein:
the filter has a filter characteristic to eliminate the pitching vibration of the vehicle body with frequency spectrum of 1 to 3 Hz.

12. An electric drive vehicle according to claim 10, further comprising:
a weight detector which detects a load of cargo; and a filter characteristic calculation unit which calculates the pitching vibrational frequency spectrum of the vehicle body based on a value of the load detected by the weight detector; wherein:
the filter eliminates the pitching vibrational frequency spectrum of the vehicle body calculated by the filter characteristic calculation unit.

13. An electric drive vehicle according to claim 12, wherein:
the filter characteristic calculation unit calculates a pitching vibrational frequency of the vehicle body so that the pitching vibrational frequency of the vehicle body can decrease as the value of the load increases.

14. An electric drive vehicle according to claim 12, wherein:
a threshold for determining whether the cargo is loaded or not is set in advance; and
the filter characteristic calculation unit outputs a first pitching vibrational frequency when the value of the load detected by the weight detector is not smaller than the threshold while the filter characteristic calculation unit outputs a second pitching vibrational frequency when the value of the load detected by the weight detector is smaller than the threshold.

* * * * *